US010567491B2

(12) United States Patent
Smadja et al.

(10) Patent No.: US 10,567,491 B2
(45) Date of Patent: Feb. 18, 2020

(54) SYSTEMS AND METHODS FOR AVOIDING NETWORK CONGESTION ON WEB-BASED SURVEY PLATFORMS

(71) Applicant: Toluna Israel Limited, Haifa (IL)

(72) Inventors: Frank Smadja, Haifa (IL); Jerome Labbe, Larchmont, NY (US); Nitin Patel, Andover, MA (US)

(73) Assignee: Toluna Israel, Haifa (IL)

( * ) Notice: Subject to any disclaimer, the term of this patent is extended or adjusted under 35 U.S.C. 154(b) by 221 days.

(21) Appl. No.: 15/653,111

(22) Filed: Jul. 18, 2017

(65) Prior Publication Data

US 2018/0041569 A1 Feb. 8, 2018

Related U.S. Application Data

(60) Provisional application No. 62/370,908, filed on Aug. 4, 2016.

(51) Int. Cl.
*G06F 15/16* (2006.01)
*H04L 29/08* (2006.01)
*G06F 16/9535* (2019.01)
*G09B 7/077* (2006.01)

(52) U.S. Cl.
CPC ...... *H04L 67/1002* (2013.01); *G06F 16/9535* (2019.01); *G09B 7/077* (2013.01); *H04L 67/306* (2013.01)

(58) Field of Classification Search
CPC ... H04L 67/1002; H04L 67/02; H04L 67/327; H04L 67/306; G06F 16/9535; G06F 17/30867; G06F 9/445; G06F 9/4451; G06Q 10/10; G06Q 30/02; G06Q 30/0201; G09B 7/02; G09B 7/077
See application file for complete search history.

(56) References Cited

U.S. PATENT DOCUMENTS

| | | | | |
|---|---|---|---|---|
| 9,824,369 | B1* | 11/2017 | Comer | G06Q 30/0201 |
| 2007/0185986 | A1* | 8/2007 | Griffin | G06Q 30/02 |
| | | | | 709/224 |
| 2009/0055915 | A1* | 2/2009 | Piliouras | G06F 21/41 |
| | | | | 726/8 |
| 2011/0231410 | A1* | 9/2011 | Hahn | G06Q 30/00 |
| | | | | 707/748 |

(Continued)

OTHER PUBLICATIONS

Wikipedia, "Quantile", https://en.wikipedia.org/wiki/Quantile.
U.S. Appl. No. 62/370,908, filed Aug. 4, 2016.

*Primary Examiner* — Benjamin M Thieu
(74) *Attorney, Agent, or Firm* — McCarter & English, LLP

(57) ABSTRACT

Systems and methods for avoiding network congestion on a web-based survey system are provided using dynamic profiling of users and transmitting the most valuable survey. The system can receive information associated with a user and a number of surveys requested. The system can prompt the user to respond to the first set of routable questions. The system queries a router for a set of surveys with open sub quotas based on the information associated with the user and the answers to the first set of routable questions. The set of surveys are inserted into a list of surveys. Each survey in the list of surveys is assigned a score based on the priority of the survey, the difficulty of the survey and the urgency of the survey and sorted. The system can transmit at least one survey from the list of surveys.

16 Claims, 5 Drawing Sheets

(56) References Cited

U.S. PATENT DOCUMENTS

| | | | | |
|---|---|---|---|---|
| 2011/0239243 A1* | 9/2011 | Dierks | .................. | G06Q 30/02 |
| | | | | 725/14 |
| 2012/0284324 A1* | 11/2012 | Jarville | .............. | G06Q 30/0201 |
| | | | | 709/203 |
| 2013/0073507 A1* | 3/2013 | Sera | ........................ | B60L 58/12 |
| | | | | 706/46 |
| 2013/0132156 A1* | 5/2013 | Grossman | .......... | G06Q 30/0204 |
| | | | | 705/7.32 |
| 2017/0032418 A1* | 2/2017 | Niesen | ............... | G06Q 30/0259 |

* cited by examiner

SYSTEMS AND METHODS FOR AVOIDING NETWORK CONGESTION ON WEB-BASED SURVEY PLATFORMS

CROSS-REFERENCE TO RELATED APPLICATION

The present application claims priority benefit to a U.S. provisional application entitled "Systems and Methods for Avoiding Network Congestion on Web-Based Survey Platforms," which was filed on Aug. 4, 2016, and assigned Ser. No. 62/370,908. The entire content of the foregoing provisional application is incorporated herein by reference.

BACKGROUND

Background Art

Web-based survey systems can face network congestion by transmitting users numerous surveys which remain incomplete. The incomplete status of surveys requires survey retransmission to multiple users in an effort to obtain the requisite survey responses. Currently, surveys are generally not sorted, so that an extremely valuable survey for a specific rare user demographic could be difficult to complete due to the random transmission of surveys to potential respondents without a ranking of and/or prioritization based on demographic rarity. There is also an insufficient use of routable questions, which would allow prioritization between a user who is a match for a survey based on only the demographic information and a user who is a match based on both demographic and routable information. Routable questions can be information associated with a user derived from questions. For example, routable questions derive the gender of a user, an age group, type of car owned by the user and various other information associated with the user.

The quantiles as well as the high priority survey don't really help to prioritize user access to surveys based on demographic rarity since the user can select any survey offered to the user. Furthermore, completion conversion rate is not sufficient in order to prioritize surveys. There are many other factors that can have an influence on survey completion.

Of note, quantiles used to gauge survey completion are not true quantiles. A true quantile distribution (https://en.wikipedia.org/wiki/Quantile) splits the distribution into five equal sets; in reality, with the way it is done today, most surveys are in the 4th and 5th quantiles. So that, in fact, this neutralizes the use of quantiles. In general, less than 15% of the surveys are in quantiles (1,2,3,4) and 85% are in quantile Q5.

There is no valid handling of race projects: race projects are projects with multiple suppliers competing with each other to deliver the required number of survey completions. Each provider takes what they can deliver. So maximizing traffic quickly is key.

The current process of calculating start to complete ratio at the survey level delays recognizing underperforming sub quotas.

Thus, there are many issues that require consideration in attempting to improve survey completion performance and reduction of network congestion associated with survey processing.

SUMMARY

Exemplary embodiments of the present disclosure include systems and methods for avoiding network congestion by processing data rapidly by transmitting an accurate set of the data to a user. The system processes the incomplete surveys rapidly by transmitting the most accurate surveys to a user. The system further provides the most accurate survey to a user by (i) using sub quotas effectively and (ii) dynamically profiling a user. By calculating start to complete ratio at the sub quota level, the disclosed system/method immediately identifies underperforming sub quotas and allows for more granular and effective quintile construction.

In exemplary embodiments, a computing system including a server, a database storing surveys and a router including open sub quotas associated with each survey of the available surveys, receives an input from a user. The input includes information associated with the user and a number of surveys requested. The surveys includes routable questions. Each sub quota in the router is a conjunction of a plurality of parameter value requirements based on the information associated with the user and the answer to the first set of routable questions.

The computing system queries the database for a first set of routable questions from the surveys based on the information associated with the user. The user is prompted to answer each question in the first set of routable questions. Subsequent to receiving the answers to the first set of routable questions, the computing system queries the router for a first set of open sub quotas associated with a first set of surveys that match the information associated with the user and the answers to the routable questions. The surveys associated with the first set of open sub quotas are inserted in a first list of surveys. At least one of the surveys from the first list of surveys is transmitted to the user.

In some embodiments, if the number of requested surveys is equal to one (1), the computing system transmits a survey assigned the highest score in the first list of surveys to the user. Alternatively, the computing system transmits the user a random survey from the first list of surveys.

In exemplary embodiments, the database includes one or more tactical questions. If the user does not answer a subset of routable questions from the first set of routable questions, the computing system inserts a second set of surveys including the unanswered subset of routable questions in a second list of surveys. The computing system queries the database for at least one tactical question and requests the user to answer the at least one tactical question. The computing system further queries the database for the unanswered subset of routable questions and requests the user to answer the unanswered subset of routable questions. Subsequent to receiving the tactical question and the routable questions, the computing system dynamically creates a data table in the database associated with the user indicating the answers to the subset of routable questions and tactical question.

In exemplary embodiments, the computing system assigns a score to each survey in the first set of surveys and the second list of surveys based on a priority parameter, an urgency parameter and a difficulty parameter. The computing system calculates the priority parameter, urgency parameter and difficulty parameter based on an output of a step function using the mapped value. The step function is governed by the following mathematical expression:

$Step(x)=1\div(1+e^{-5x})$, wherein $x$ is the mapped value.

The computing system sorts each survey from first and second lists of surveys in descending order based on the score assigned to each survey.

In some embodiments, if the number of requested surveys is greater than one (1), the computing system creates a third list of surveys by applying merge sort of the first list of surveys and second list of surveys and transmitting a number of surveys equal to the number of requested surveys from the third list of surveys to the user.

Additional advantageous features and functions of the disclosed systems and methods will be apparent from the description which follows, particularly when read in conjunction with the appended figures.

BRIEF DESCRIPTION OF FIGURES

Illustrative embodiments are shown by way of example in the accompanying figures and should not be considered as a limitation of the present disclosure.

DETAILED DESCRIPTION

Described in detail herein are systems and methods for avoiding network congestion on a web-based survey system using dynamic profiling of users and transmitting the most valuable surveys to the users based on demographic "rarity" to avoid forwarding users multiple surveys that remain incomplete. By demographic rarity is meant a user that possesses one or more attributes that are relatively rare/unique as compared to the population-at-large.

The system can receive an input from the user or panel of users. The input includes information associated with the user and a number of surveys requested. The system queries the database for a first set of routable questions from the surveys based on the information associated with the user and prompts the user to respond to the first set of routable questions. Routable questions can be information associated with a user derived from questions. For example, routable questions derive the gender of a user, an age group, type of car owned by the user and various other information associated with the user. The system queries the database for a set of surveys with open sub quotas based on the information associated with the user and the answers to the first set of routable questions. The set of surveys are inserted into a list of surveys. Each survey in the list of surveys is assigned a score based on three parameters, the priority of the survey, the difficulty of the survey and the urgency of the survey. The list is sorted in a descending order based on the score of each survey. The system can transmit at least one survey from the list of surveys. The transmitted survey can be the survey with the highest generated score, or a random survey from the list of surveys.

Figure 1:
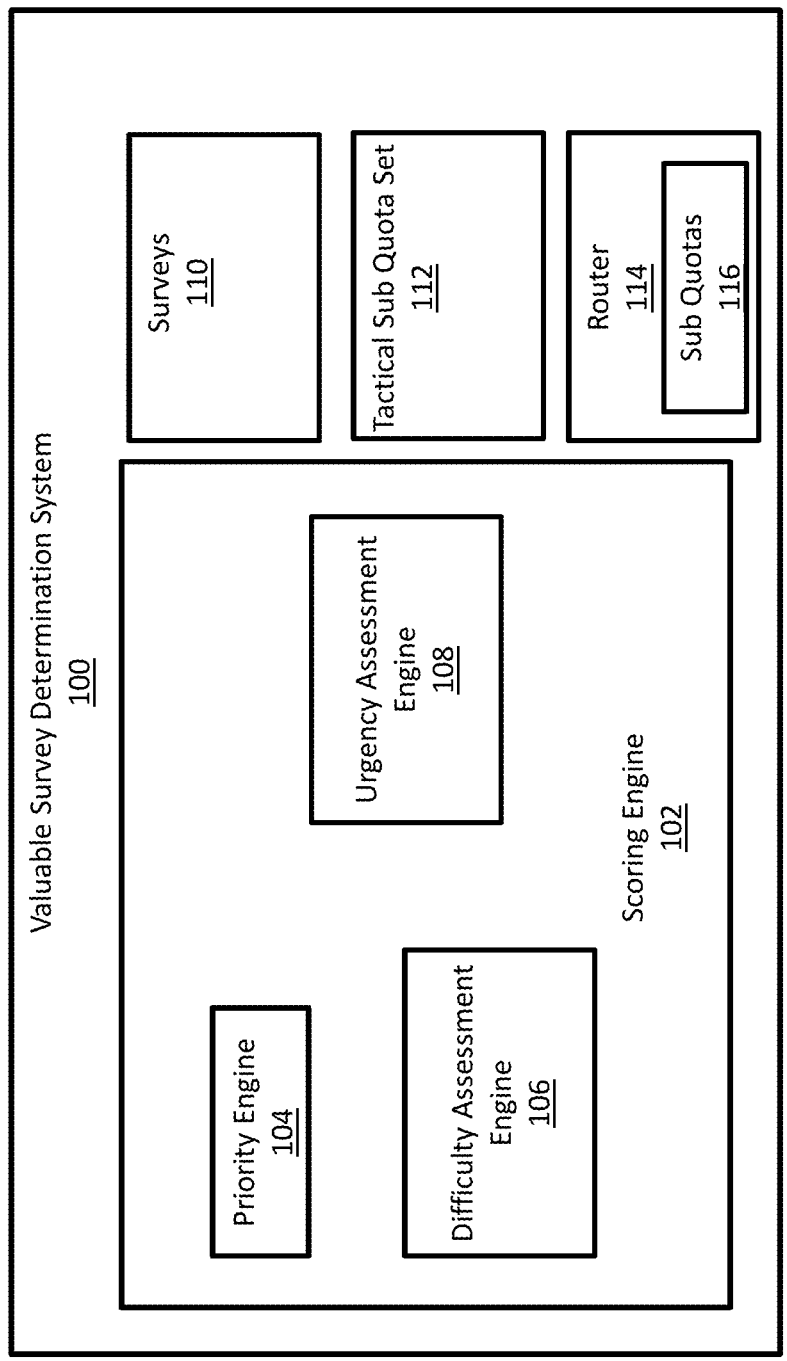
FIG. 1 is a block diagram of an exemplary survey determination system.

FIG. 1 is a block diagram of an exemplary scoring engine 102 for a survey determination system 100. The survey determination system 100 can include a scoring engine 102 and within the scoring engine 102, the survey determination system 100 can include a priority engine 104, a difficulty assessment engine 106 and a urgency assessment engine 108. The survey determination system 100 can further include surveys 110, a tactical sub quota set 112 and a router 114. The router can hold the open sub quotas 116 associated with the surveys 110.

As mentioned above, each survey is given a score and the surveys are ordered based on the score. The scoring engine 102 can calculate the SvS. The SvS is the survey score which is a function of the completion conversion rate (as before) but also a function of the emergency factor of the survey as well as a given priority factor. The SvS can be calculated based on three parameters, the priority parameter, the difficulty factor and the urgency factor. The SvS works at the sub quota level, so in a non-limiting example, each sub quota in a survey will have its own SvS so that a survey that has 4 open sub quotas will be associated with 4 different scores. A sub quota is a conjunction of multiple parameter values requirements from any of the demographic parameters and routable questions for each survey. For example, a survey can have the following sub quota:
((Gender==Male) AND (Age between 25 AND 35)),
((Gender==Male) AND (Smoker==TRUE)),
((Gender==Female) AND (Region==Midwest) AND (Cars-inhousehold==3)).

Sub quotas can be ranked according to their SvS priority score based on a number of mostly unrelated parameters which are combined. The default priority score will be equal to 1 and higher priority surveys will have a score greater than 1 while lower priority sub quotas will have a score lower than one. The priority score can be generated by the priority engine and can be is computed using the following equation:

$$\text{Score} = \prod_i parameter_i \qquad (1)$$

A neutral parameter will return 1, a penalizing parameter will return a value between 0 and 1; finally a boosting parameter will return a value greater than 1 (no upper limit). As a basic ranking function we will use an approximation of the step function as defined in the following equation:

$$\text{Step}(x) = 1 \div (1 + e^{-5x}) \qquad (2)$$

Figure 2:
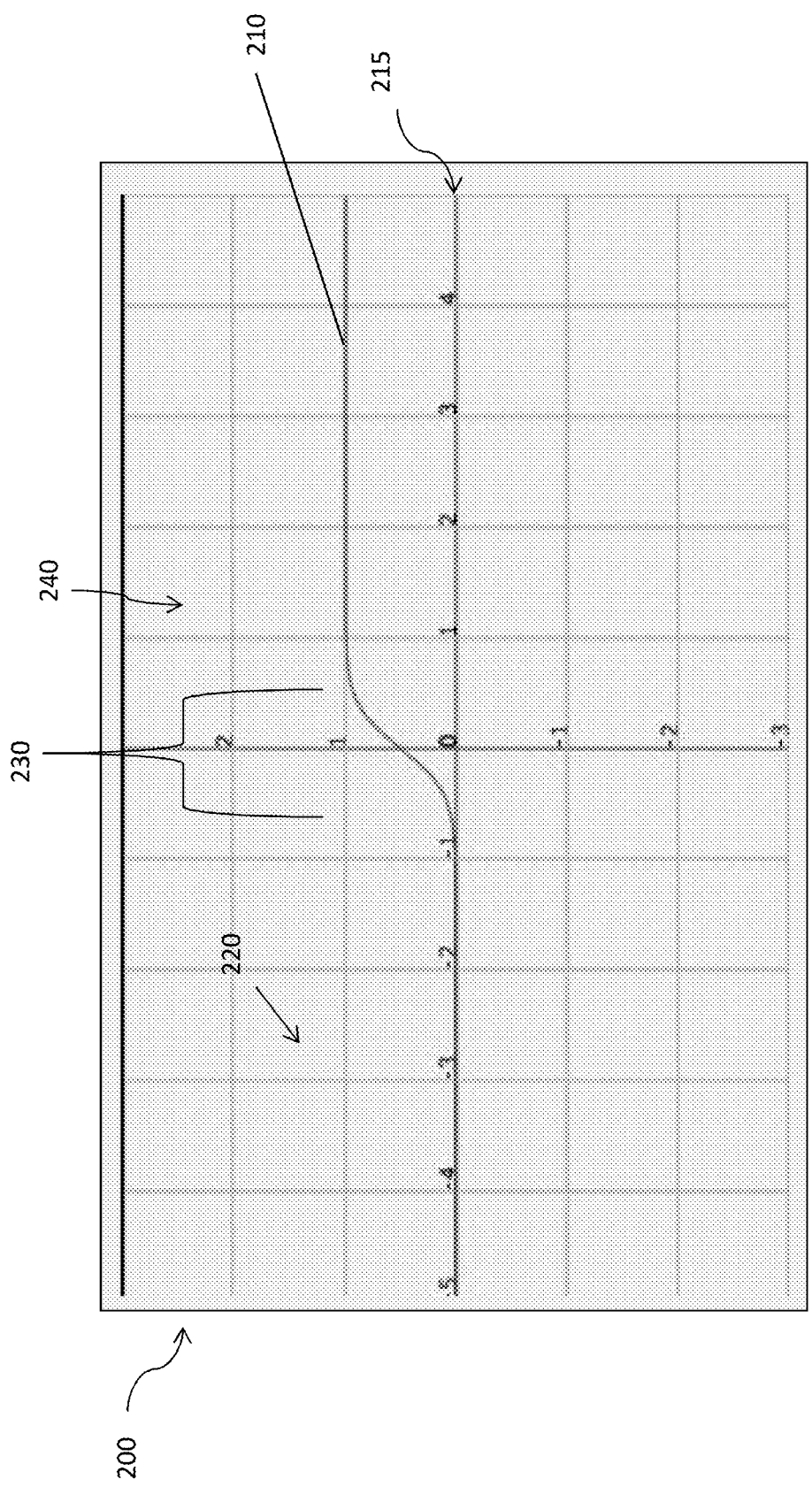
FIG. 2 shows a graph of an output of a step function used for scoring surveys.

Plot 200 of an output 210 of the step function as a function of the mapped value 215 is shown in FIG. 2. As shown in FIG. 2, the output 210 of the step function can be divided into three value sections: a low value section 220, a transition value 230, and a high value 240. For mapped values that are less than about negative one, the output of the step function is in the low value section 220, which corresponds to an output value of zero in the present embodiment. For mapped values that are greater than one, the output of the step function is in the high value 230 section, which corresponds to an output value of one in the present embodiment. For mapped values between negative one and positive one, the output of the step function is in the transition section 240, which corresponds to an output value of between zero and one depending on the. mapped value.

The parameter value can be defined using the following equation:

$$P(i,x) = \text{Min}(i) \text{Range}(Px = +i) * \text{Step}(\text{Map}(i,x)) \qquad (3)$$

In equation 3, the Min and (Min+Range) or Max indicate the minimum and maximum value for the parameter. For example, if the min is 1.0 and its range is 0.1, the parameter can only impact very little and only positively. Alternatively, a parameter that will have a huge influence can be of min=0.1 and range=2.0. If the parameter P(i) needs to be between min and max Min(i)=min and Range(i)=max−min. The Map(i,x) used in the formula above indicates a non-normalized factor for the parameter i, that can be taken into account for the score. The Map functions should be a growing function of x where x is a defined input for the parameter i. Because of the step function, that below an x value of −1, the P(i,x) will be mostly equal to the Min(i) and above 1, P(i,x) will be mostly equal to Min(i)+Range(i).

The SvS can be a growing function of three parameters. A manually set priority factor generated by the priority engine. This factor is between 1 and 5 in which 1 is the highest priority and 5 is the lowest and default priority. An urgency factor generated by the urgency assessment engine. The urgency assessment engine determines if a survey sub quota is filling out less than expected, and in response to determining the survey sub quota is filling out less than expected, the urgency assessment engine raises the urgency to give it a higher score. A difficulty factor generated by the difficulty assessment engine. The difficulty assessment engine determines the difficulty of the survey at the sub quota level. The determined difficulty factor is based on the attributes and routable questions that are required for the sub quota. In other embodiments other parameters could be added.

As mentioned above the priority engine 104 can generate the priority parameter. For example, the priority parameter is between 1 and 5, so the map function can be defined as using the following equation:

$$\text{Map(priority)}M=1.5-(\text{priority}\div 2)) \tag{4}$$

In a non-limiting example, a priority 1 will map to a value of 1 and priority 5 will map to a value of −1. The factor of the priority will thus be computed as:

$$P(\text{priority})=\text{Min(priority)}+\text{Factor(priority)}\times\text{Step(Map(priority))} \tag{5}$$

In equation 5, the Min and Factor are predefined parameters.

As mentioned above, the difficulty factor can be generated by the difficulty assessment engine 106. The difficulty of the survey needs to be evaluated based on the survey's targeting at the sub quota level so that the user can receive the most valuable survey. The difficulty assessment engine can call a feasibility engine with the sub quota description and the feasibility engine can return the estimated size of the sub quota. The size of the sub quota can be divided by a panel of users size for the culture resulting with a probability (between 0 and 1) of an individual to be in this sub quota. The map function is the following equation:

$$\text{Map}(p\text{Sub}Q)=(p\text{sub}Q\times 2)-1 \tag{6}$$

In equation 6, pSubQ can represent the probability. Based off the map function the difficulty assessment engine can generate the difficulty factor using the following equation:

$$P(p\text{Sub}Q)=\text{Min}(p\text{Sub}Q)+\text{Factor}(p\text{Sub}Q)\times\text{Step(Map}(p\text{Sub}Q)) \tag{7}$$

In equation 7, Min and Factor are predefined parameters.

As mentioned above, the urgency assessment engine 108 can generate an urgency factor. The urgency factor can be determined based on a survey that becomes urgent based on its passed completion rate. If the survey continues at its passed completion rate, there will be less probability of completion. The survey can have the following attributes: Days in field: DF (measured in hours); Current days in field: CDF (measured in hours), how much of its time life the survey currently has done; Total Completes required: TC; and Current Completes: CC, how many completes it has accumulated so far. A survey is thus has less probability of completion based on the following equation:

$$(CC\div CDF)<(TC\div DF) \tag{8}$$

In equation 8, the Map function can be defined as the following equation:

$$\text{Map(urgency)}=-1+(TC\times CDF)\div(CC\times DF) \tag{9}$$

In equation 9, the Map function is starting with CC equal to 0 and the Map as a co, in the opposite case of the survey having already received all its completes (TC=CC) Map will be close to 0. And the overall factor for the urgency will be computed as:

$$P(\text{urgency})=\text{Min(urgency)}+\text{Factor(urgency)}\times\text{Step(Max(urgency))} \tag{10}$$

In equation 10, the Min and Factor are predefined parameters.

The scoring engine can combine the priority parameter, the urgency factor and the difficulty factor, will thus generate the SvS using the following equation:

$$SvS=P(\text{priority})\times P(p\text{Sub}Q)\times P(\text{urgency}) \tag{11}$$

In a non-limiting example, the initial parameters for Min and Factor as shown in Table 1 can be used, which implies the Max value as shown in Table 1.

TABLE 1

Min, Factor and Max Values

|  | Priority | Difficulty | Urgency |
|---|---|---|---|
| Min | 0.5 | 0.5 | 0.5 |
| Factor | 2 | 1 | 1 |
| Max | 2.5 | 1.5 | 1.5 |

In exemplary embodiments, the priority parameter is given more weight when calculating the SvS.

Figure 3:
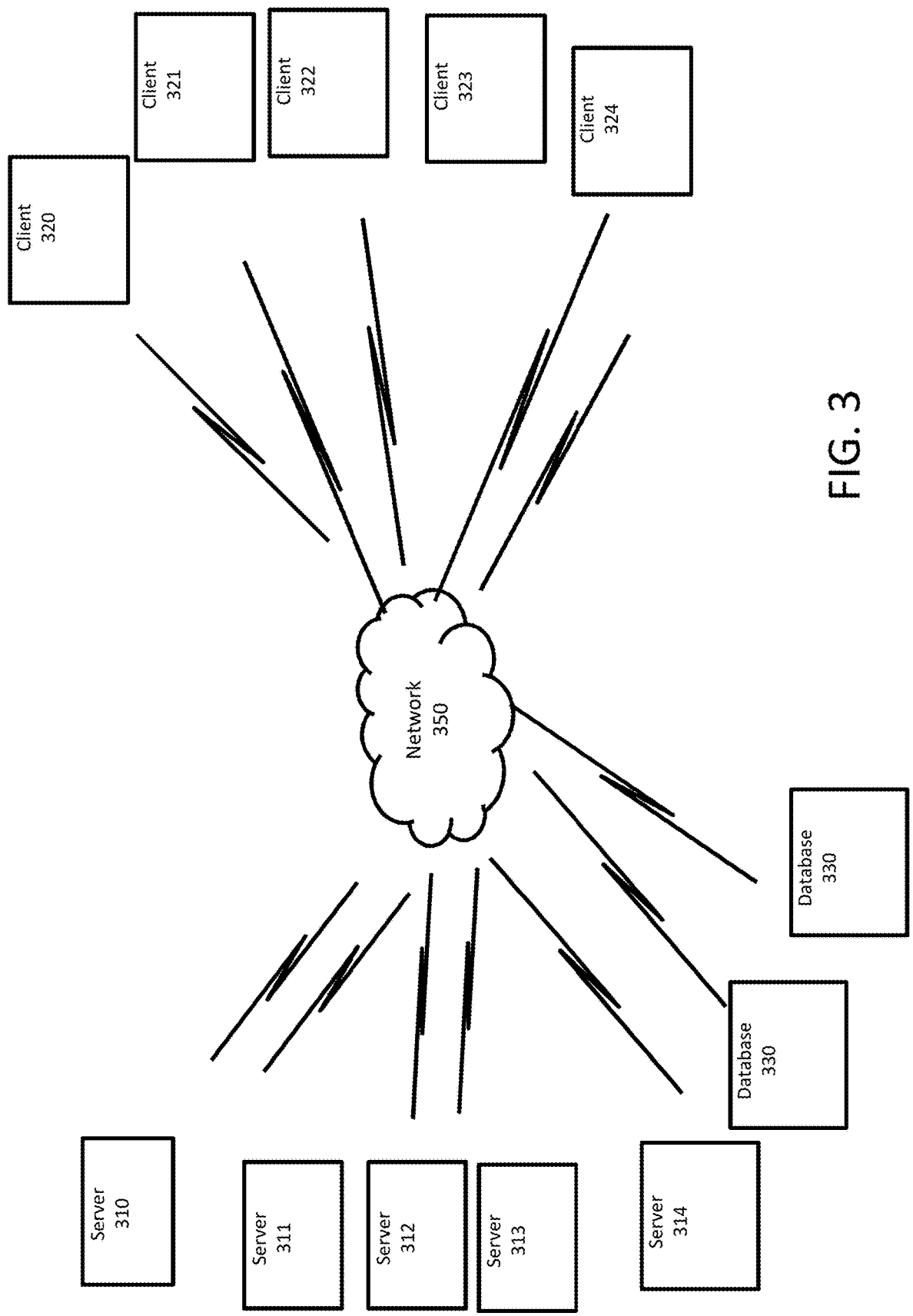
FIG. 3 is a block diagram of an exemplary network environment of the survey determination system according to the present disclosure.

FIG. 3 is a block diagram of an exemplary network environment of the survey determination system according to the present disclosure. The network environment 300 includes servers 310-314 operatively coupled to clients 320-324, via a communication network 350, which can be any network over which information can be transmitted between devices communicatively coupled to the network. For example, the communication network 350 can be the Internet, Intranet, virtual private network (VPN), wide area network (WAN), local area network (LAN), and the like. The network environment 300 can include repositories or database devices 330, which can be operatively coupled to the servers 310-314, as well as to clients 320-324, via the communications network 350. The servers 310-314, clients 320-424, and database devices 330 can be implemented as computing devices. Those skilled in the art will recognize that the database devices 430 can be incorporated into one or more of the servers 310-314 such that one or more of the servers can include databases.

In exemplary embodiments, the survey determination system 100 can be distributed among different devices (e.g., servers, clients, databases) in the communication network 350 such that one or more components of the valuable survey determination system 100, or portions thereof, can be implemented by different devices in the communication network 350. For example, in illustrative embodiments, the scoring engine 102, priority engine 104, a difficulty assessment engine 106 and a urgency assessment engine 108 can be implemented by the server 311.

In an exemplary embodiment, servers 310-314 can be web servers configured to host web pages. Server 310 can be configured to implement the valuable survey determination system 100 and servers 311-314 can be configured to host surveys for a survey hosting site. Client 320 cart represent the surveying 'entity and clients 321-324 can represent survey respondents. The database devices 330 can be configured to store surveys, routable questions, user information and multiple parameter value requirements of each survey, and the like. In an exemplary operation, the respondents can access and respond to the surveys hosted by the servers 311-314 using a web browser implemented by the client devices. The surveys can be presented to the respondents in an ordered list arranged by the priority score determined by the valuable survey determination system 100 such that surveys having a higher priority score are towards the top of the list.

The databases 330 can include the surveys, tactical sub quotas and data tables indicating whether a user has been dynamically profiles. For example, once a user has been dynamically profiled the database 330 can dynamically create a data table flagging the user as dynamically profiled and storing the information associated with the user's profile. The processes of dynamic profiling will be discussed in detail herein.

Figure 4:
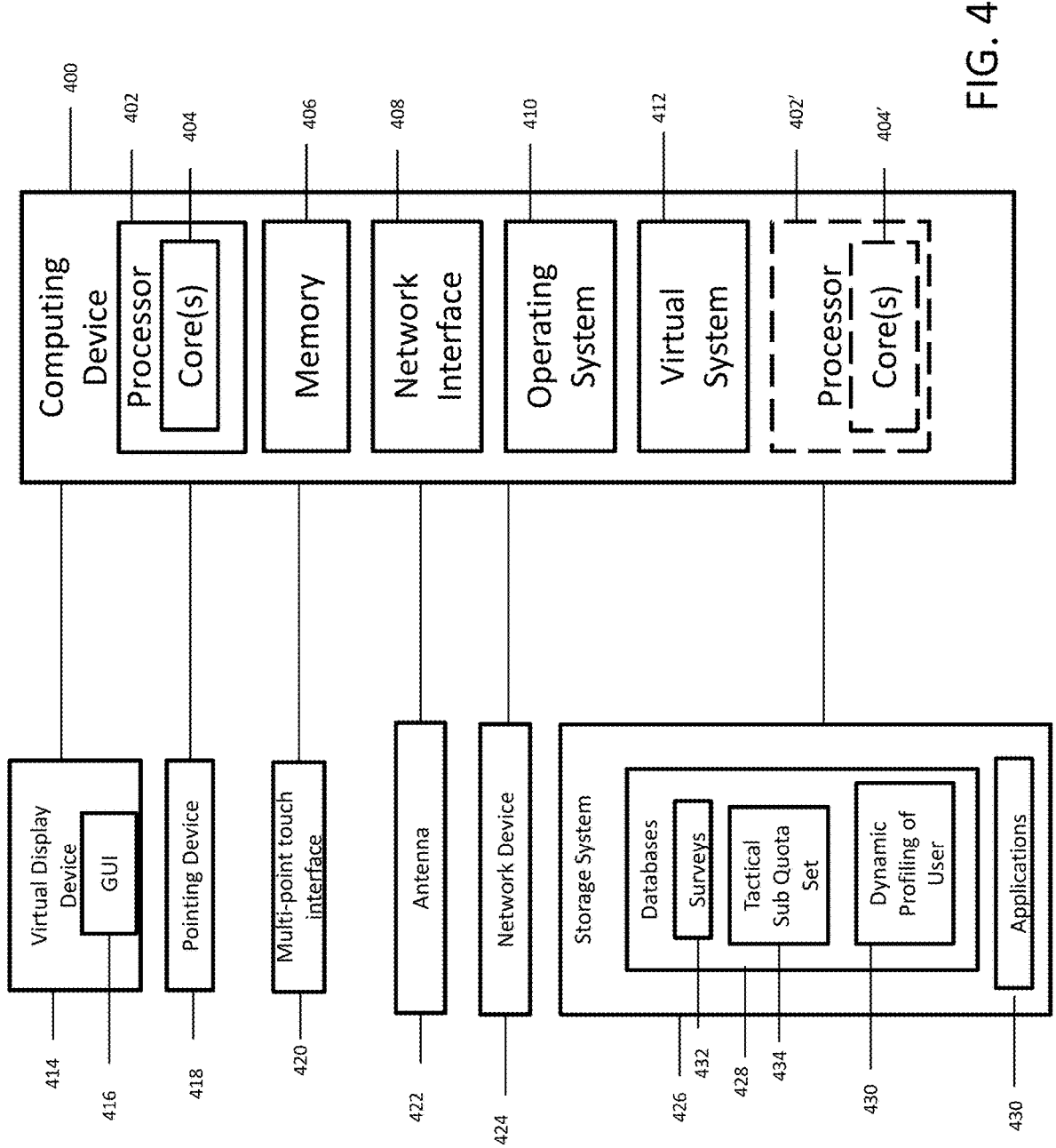
FIG. 4 is a block diagram of an example computing device according to exemplary embodiments of the present disclosure.

FIG. 4 is a block diagram of an example computing device for implementing exemplary embodiments of the present disclosure. Embodiments of the computing device 400 can implement embodiments of the survey determination system. The computing device 400 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 406 included in the computing device 400 may store computer-readable and computer-executable instructions or software (e.g., applications 430) for implementing exemplary operations of the computing device 400. The computing device 400 also includes configurable and/or programmable processor 402 and associated core(s) 404, and optionally, one or more additional configurable and/or programmable processor(s) 402' and associated core(s) 404' (for example, in the case of computer systems having multiple processors/cores), for executing computer-readable and computer-executable instructions or software stored in the memory 406 and other programs for implementing exemplary embodiments of the present disclosure. Processor 402 and processor(s) 402' may each be a single core processor or multiple core (404 and 404') processor. Either or both of processor 402 and processor(s) 402' may be configured to execute one or more of the instructions described in connection with computing device 400.

Virtualization may be employed in the computing device 400 so that infrastructure and resources in the computing device 400 may be shared dynamically. A virtual machine 412 may be provided to handle a process running on multiple processors so that the process appears to be using only one computing resource rather than multiple computing resources. Multiple virtual machines may also be used with one processor.

Memory 406 may include a computer system memory or random access memory, such as DRAM, SRAM, EDO RAM, and the like. Memory 406 may include other types of memory as well, or combinations thereof.

A user may interact with the computing device 400 through a visual display device 414, such as a computer monitor, which may display one or more graphical user interfaces 416, multi touch interface 420 and a pointing device 418.

The computing device 400 may also include one or more storage devices 426, such as a hard-drive, CD-ROM, or other computer readable media, for storing data and computer-readable instructions and/or software that implement exemplary embodiments of the present disclosure (e.g., applications). The databases 428 may be updated manually or automatically at any suitable time to add, delete, and/or update one or more data items in the databases. The databases 428 can include information such as surveys 432, tactical sub quota set 434, and dynamic profiling of user 436.

The computing device 400 can include a network interface 408 configured to interface via one or more network devices 424 with one or more networks, for example, Local Area Network (LAN), Wide Area Network (WAN) or the Internet through a variety of connections including, but not limited to, standard telephone lines, LAN or WAN links (for example, 802.11, T1, T3, 56kb, X.25), broadband connections (for example, ISDN, Frame Relay, ATM), wireless connections, controller area network (CAN), or some combination of any or all of the above. In exemplary embodiments, the computing system can include one or more antennas 422 to facilitate wireless communication (e.g., via the network interface) between the computing device 400 and a network and/or between the computing device 400 and other computing devices. The network interface 408 may include a built-in network adapter, network interface card, PCMCIA network card, card bus network adapter, wireless network adapter, USB network adapter, modem or any other device suitable for interfacing the computing device 400 to any type of network capable of communication and performing the operations described herein.

The computing device 400 may run any operating system 410, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 400 and performing the operations described herein. In exemplary embodiments, the operating system 410 may be run in native mode or emulated mode. In an exemplary embodiment, the operating system 410 may be run on one or more cloud machine instances.

Figure 5:
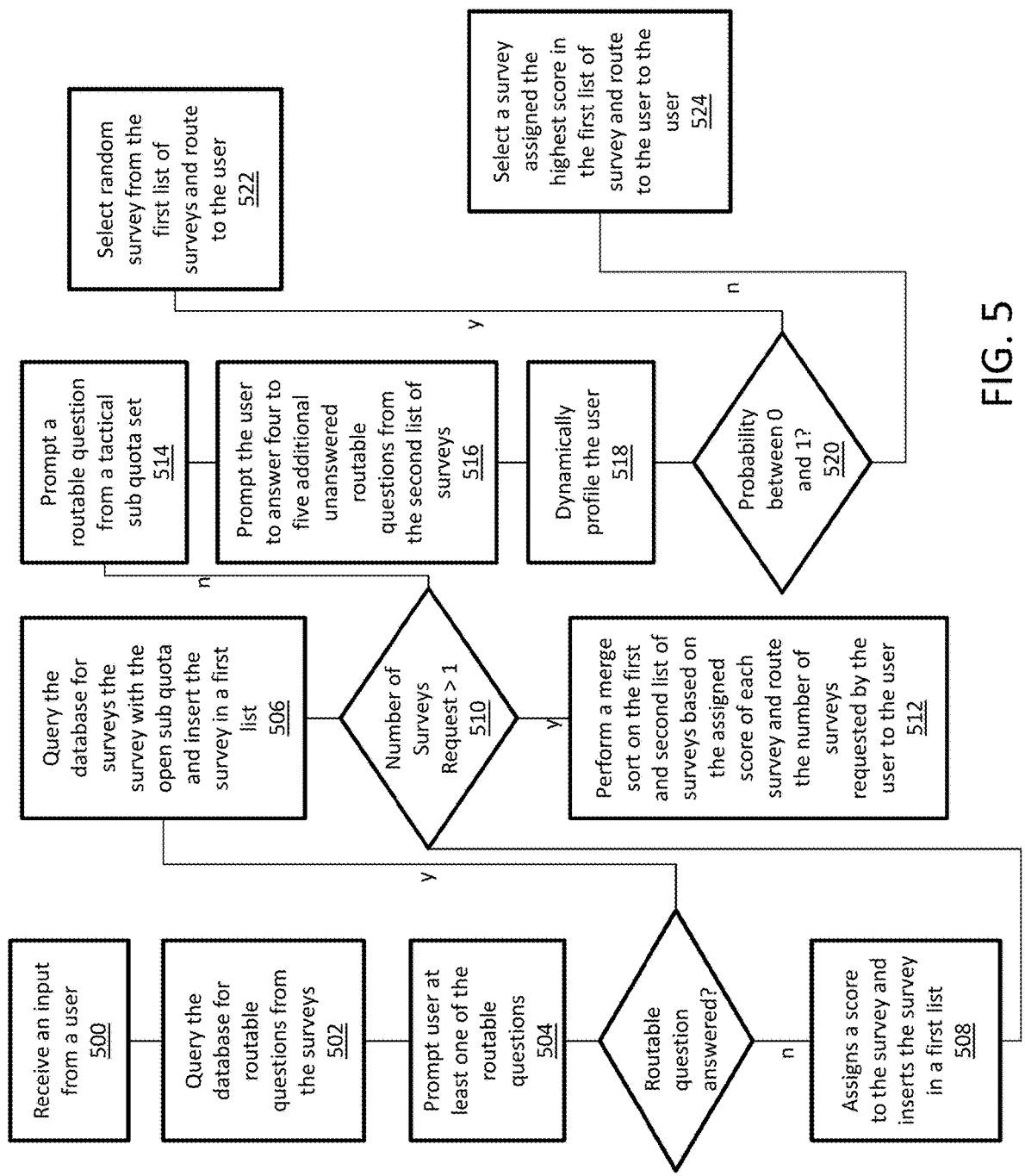
FIG. 5 is a flowchart illustrating an exemplary process of dynamic profiling in accordance with exemplary embodiments of the present disclosure.

FIG. 5 is a flowchart illustrating an exemplary process of an exemplary survey determination system according to the present disclosure. In operation 500, the computing system receives an input from a user. The input includes information associated with the user and a number of surveys requested. The information associated with the user can include demographic information. In operation 502, the computing system queries the database for routable questions from the surveys. In operation 504, the computing system prompts the user to answer at least one of the routable questions from the surveys.

In operation 506, in response to receiving a valid answer to a routable question for a survey or the survey not having a routable question, the computing system queries the database for possible open sub quota for surveys candidate to be presented to the user. As mentioned above, a sub quota is a conjunction of multiple parameter values requirements from any of the demographic parameters and routable questions. For example, the following are all valid and exemplary subquota: ((Gender==Male) AND (Age between 2535)); ((Gender==Male) AND (Smoker==TRUE)); ((Gender==Female) AND (Region==Midwest) AND (Cars-inhousehold==3)). At any given time, a router can hold a set of sub quotas that can each be associated to a survey. In another example, if a survey S1 is looking for 300 males and 300 females, and survey S2 is looking for 500 males and 600 females of age between 25 and 35, the router will hold 4 sub quotas: (gender==Male), required 300, surveyid=S1; (gender==Female), required 300, surveyid=S1 (gender==Male), required 500, surveyid=S2 ((gender==Female) AND (Age between 2535)) required 600, surveyid=S2. The computing system assigns a score to the survey with an open sub quota based on the priority, difficulty and urgency, and inserts the survey into a first list of surveys.

In operation 508, in response to a survey having at least one routable question and not receiving an answer to the at least one routable question for the survey, the computing system assigns a survey score based on the priority, difficulty and urgency, and inserts the survey into a second list of surveys.

In operation 510, the computing system determines whether the number of surveys requested is more than one.

In operation 512, in response to determining to the number of surveys requested is more than one, the computing system performs a merge sort on the first and second list of surveys based on the assigned score of each survey and routes the number of surveys requested by the user to the user. Merge sort is a sorting algorithm in which each list is divided and sorted into shorter sub-lists. The sub-lists are merged until there is one final sorted list. The surveys that have non-answered routable questions will have to be answered by the user once the user receives the particular survey.

In operation 514, in response to determining the number of surveys requested by the user is one, the computing system prompts the user a routable question from a tactical sub quota set. A tactical sub quota is a set of priority sub quota that are generally manually defined and whose goal is to perform tactical profiling of the users regardless of the fact that there are or are not open surveys in the sub quota. These sub quota will be kept open on the router and added to the dynamic profiling by the router. For example, an exemplary tactical sub quota is: (gender==male) AND (smoker==true)). The routable question from the tactical sub quota set is randomly selected for the user provided the user information matches the other criteria in the sub quota.

In operation 516, the computing system prompts the user to answer a series, e.g., four to five, additional unanswered routable questions from the second list of surveys. The four to five additional unanswered routable questions will be selected from the highest scoring surveys in the second list of surveys.

In operation 518, in response to receiving a response to the routable question from the tactical sub quota set and the additional routable questions, the computing system will dynamically profile the user. The computing system can dynamically create one or more data tables in the database indicating the user has been dynamically profiled. The data tables can include the answers to the additional (e.g., four to five) routable questions and the routable question from the tactical sub quota. The computing system will query the database to check whether the user has been dynamically profiled before. In response to determining the user has been dynamically profiled, the computing system will not dynamically profile the user a subsequent time. Dynamic profiling is determined by the list of routable questions that need to be asked to the user. In some embodiments, there will be at most 5 routable questions asked to the user.

In operation 520, the computing system determines whether probability of presenting a valuable survey to the user from the first list of surveys is equal to a parameter p between 0 and 1 or equal to (1−p).

In operation 522, in response to determining the p between 0 and 1, a random survey is selected from the first list of surveys and routed to the user.

In operation 524, alternatively in response to determining p equal to (1−p), a survey assigned the highest score in the first list of survey is routed to the user.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. A system for avoiding network congestion on a web-based survey system, the system comprising:
  a computing system including a server, a database storing a plurality of surveys and a plurality of tactical questions, and a router including a plurality open sub quotas associated with each survey of the plurality of surveys, wherein the plurality of surveys include at least one routable question, the computing system programmed to:
    receive an input from a user, wherein the input includes information associated with the user and a number of surveys requested;
    query the database for a first set of routable questions from the plurality of surveys based on the information associated with the user;
    request an answer to each question in the first set of routable questions;
    in response to receiving an answer to the first set of routable questions, the computing system is programmed to:
      query the router for a first set of open sub quotas associated with a first set of surveys matching the information associated with the user and the answer to the first set of routable questions,
      insert the first set of surveys associated with the first set of open sub quotas in a first list of surveys, and
      transmit at least one survey from the first list of surveys to the user; and
    in response to not receiving an answer to a subset of routable questions from the first set of routable questions, the computing system is programmed to:
      insert a second set of surveys including the unanswered subset of routable questions in a second list of surveys,
      query the database for at least one tactical question,
      request the user to answer the at least one tactical question,
      query the database for the unanswered subset of routable questions,
      request the user to answer the unanswered subset of routable questions, and
      in response to receiving answers to the tactical question and the routable questions, dynamically create a data table in the database associated with the user indicating the answers to the subset of routable questions and tactical question.

2. The system of claim 1, wherein a sub quota is a conjunction of a plurality of parameter value requirements based on the information associated with the user and the answer to the first set of routable questions.

3. The system of claim 1, wherein the computing system is further programmed to assign a score to each survey in the first set of surveys and the second set of surveys based on a priority parameter, an urgency parameter and a difficulty parameter.

4. The system of claim 3, wherein the computing system is further programmed to determine the priority parameter, urgency parameter and difficulty parameter using based on an output of a step function using the mapped value.

5. The system of claim 4, wherein the step function is governed by the following mathematical expression:

$$\text{Step}(x)=1\div(1+e^{-5x}),$$

wherein x is the mapped value.

6. The system of claim 3, wherein the computing system is further programmed to sort the first list of surveys in descending order based on the score assigned to each survey in the first set of surveys and sort the second list of surveys in descending order based on the score assigned to each survey in the second set of surveys.

7. The system of claim 6, wherein if the number of requested surveys is greater than 1, the computing system is programmed to merge sort the first list of surveys and second list of surveys into a third list of surveys and transmit the number of surveys equal to the number of requested surveys from the third list of surveys to the user.

8. The system of claim 6, wherein if the number requested surveys is equal to 1, the computing system is programmed to transmit, a survey assigned the highest score in the first list of surveys to the user.

9. The system of claim 6, wherein if the number requested surveys is equal to 1, the computing system is programmed to transmit, a random survey from the first list of surveys to the user.

10. A method for avoiding network congestion on a web-based survey system, the method comprising:
receiving, via a computing system including a server, a database storing a plurality of surveys and a plurality of tactical questions, and a router including a plurality open sub quotas associated with each survey of the plurality of surveys, wherein the plurality of surveys include at least one routable question the computing system, an input from a user wherein the input includes information associated with the user and a number of surveys requested;
querying, via the computing system, the database for a first set of routable questions from the plurality of surveys based on the information associated with the user;
requesting, via the computing system, an answer to each question in the first set of routable questions;
in response to receiving an answer to the first set of routable questions, the method further comprising:
querying, via the computing system, the router for a first set of open sub quotas associated with a first set of surveys matching the information associated with the user and the answer to the first set of routable questions,
inserting, via the computing, system, the first set surveys associated with the first set of open sub quotas in a first list of surveys, and
transmitting, via the computing system, at least one survey from the first list of surveys to the user; and
in response to not receiving an answer to a subset of routable questions from the first set of routable questions, the method further comprising:
inserting, via the computing system, a second set of surveys including the unanswered subset of routable questions in a second list of surveys,
querying, via the computing system, the database for at least one tactical question,
requesting, via the computing system, the user to answer the at least one tactical question,
querying, via the computing system, the database for the unanswered subset of routable questions,
requesting, via the computing system, the user to answer the unanswered subset of routable questions, and
in response to receiving answers to the tactical question and the routable questions, dynamically creating, via the computing system, a data table in the database associated with the user indicating the answers to the subset of routable questions and tactical question.

11. The method of claim 10, wherein a sub quota is a conjunction of a plurality of parameter value requirements based on the information associated with the user and the answer to the first set of routable questions.

12. The method of claim 11, further comprising assigning, via the computing system, a score to each survey in the first set of surveys and the second set of surveys based on a priority parameter, an urgency parameter and a difficulty parameter.

13. The method of claim 12, further comprising determining, via computing system, the priority parameter, urgency parameter and difficulty parameter using based on an output of a step function using the mapped value.

14. The method of claim 13, wherein the step function is governed by the following mathematical expression:

$$\text{Step}(x)=1\div(1+e^{-5x}),$$

wherein x is the mapped value.

15. The method of claim 12, further comprising sorting, via the computing system, the first list of surveys in descending order based on the score assigned to each survey in the first set of surveys and sorting the second list of surveys in descending order based on the score assigned to each survey in the second set of surveys.

16. The method of claim 15, wherein if the number requested surveys is equal to 1, the method further comprising, transmitting, via the computing system, a survey assigned the highest score in the first list of surveys to the user or transmitting, via the computing system, a random survey from the first list of surveys to the user.

* * * * *